[126.]

No. 118,938

H. R. Hill & N. W. Twiss. Lathe for Turning Irregular Forms.

Patented Sep. 12, 1871.

Witnesses:
Gustave Dieterich
Wm. H. C. Smith

Inventors:
H. R. Hill
N. W. Twiss
Per
Attorneys.

118,938

UNITED STATES PATENT OFFICE.

HENRY R. HILL AND NELSON W. TWISS, OF NEW HAVEN, CONNECTICUT.

IMPROVEMENT IN LATHES.

Specification forming part of Letters Patent No. 118,938, dated September 12, 1871.

*To all whom it may concern:*

Be it known that we, HENRY R. HILL and NELSON W. TWISS, of New Haven, in the county of New Haven and State of Connecticut, have invented a new and useful Improvement in Lathes for Turning Irregular Forms; and we do hereby declare that the following is a full, clear, and exact description thereof, which will enable others skilled in the art to make and use the same, reference being had to the accompanying drawing forming part of this specification.

This invention relates to mechanism arranged, in combination with a slide-lathe, for cutting or turning prismatic and other forms, intended more especially for turning or cutting stone columns, stone fence-posts, balusters, &c., but applicable to wood, metal, and other material; and consists in the construction and arrangement of certain parts, consisting, mainly, of a lathe-carriage, cutter, cutter-slide, spring, eccentric, and feathered shaft, whereby we are enabled, by a change in the form of the cam, to produce a variety of irregular forms, as hereinafter fully described.

Figure 1:
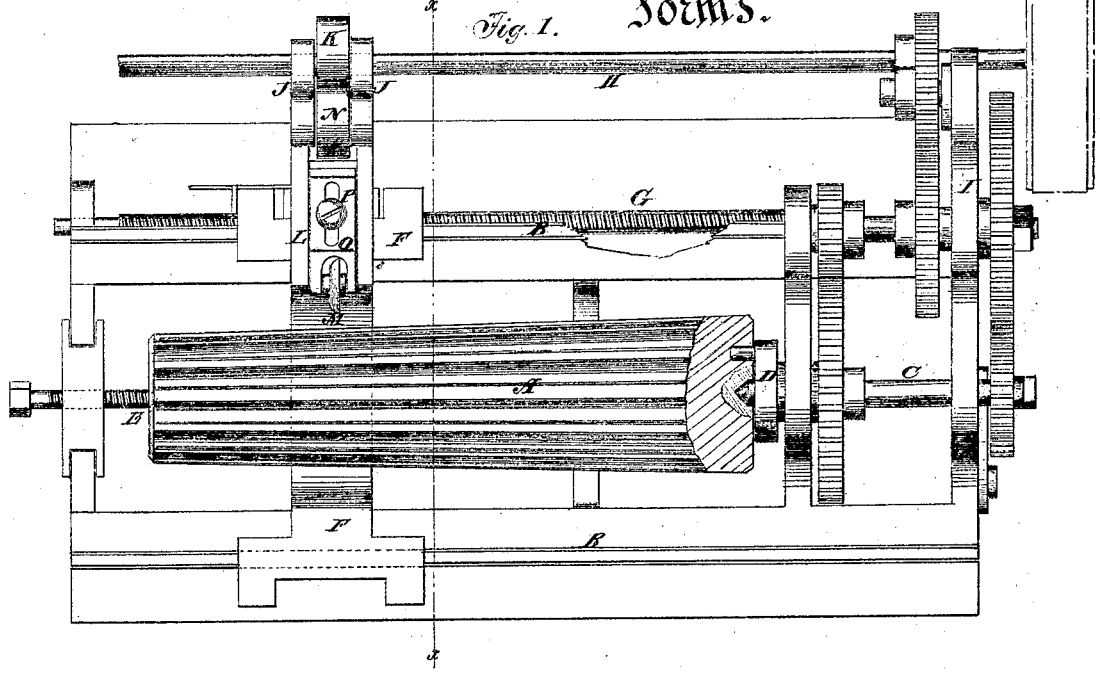
Figures 2, 3:
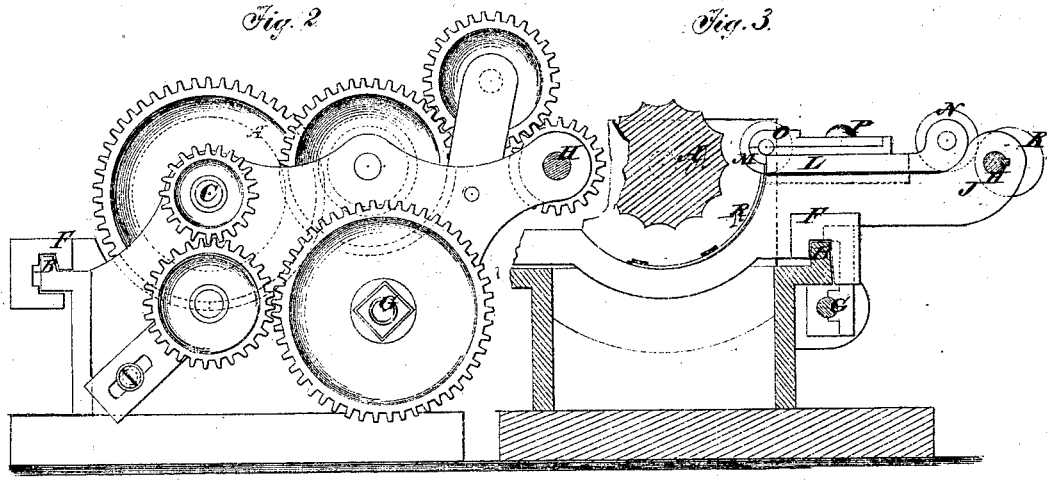
Figure 4:
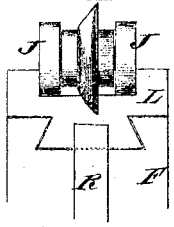

In the accompanying drawing, Figure 1 represents a top or plan view, showing the general construction of the lathe. Fig. 2 is an end view, showing the system of gear-wheels, by which the article to be turned is revolved and the feed-screw and the cam-shaft are revolved. Fig. 3 is a vertical cross-section of Fig. 1 taken on the line $x\ x$. Fig. 4 is a detail, showing the cutter and cutter-slide.

Similar letters of reference indicate corresponding parts.

A is the article to be turned. B B are the "ways" of the lathe. C is the spindle. D is the face-plate. E is the tail-center. F is the carriage, which is moved back and forth on the ways of the lathe by means of the feed-screw G. The piece to be turned is secured in the lathe and revolved, by means of changeable gear-wheels, in the ordinary manner, the arrangement being such that the speed of the revolving article may be increased or diminished, as may be desired. H is a shaft, which is placed parallel with the ways of the lathe, and connected by gear-wheels with the lathe-gearing, so as to be revolved thereby at any desired speed. This shaft has a longitudinal groove, and is supported, one end by the headpiece I of the lathe, and the other by arms J J projecting from the lathe-carriage. K is the cam or eccentric, which is provided with a feather, which works in the groove above mentioned, by which it is revolved as it slides on the shaft H. This cam is placed between the arms J J. L is the cutter-slide, and M is the cutter. N is a friction-roll on the slide, in contact with which the cam works. The slide works in a dovetail groove in the carriage, as seen in Fig. 4. The cutter is connected with a separate piece, O, which is adjustable on the slide by means of the screw P, which arrangement allows the cutter to be set up or adjusted to the work it has to do, as may be required. The cutter is attached to a loose arbor, and revolves by contact with the article to be cut. As the cam revolves the cutter is forced up to its work, the back motion being produced by a spring, R, attached to the carriage, as seen in Fig. 3. The cam is removable, so that any desired form of cam may be employed.

It will be understood that the article to be turned is constantly revolving with a uniform motion, and that the position of the cutter, at every moment of time, is governed by the cam. At first sight it appears difficult to cut a perfectly flat surface on a revolving body, as a prism or a polygon, or to flute a column or other article; but as the revolving cam, which governs the cutter, may be of any form the operation is made quite easy. For turning a taper the tail-center is moved laterally, as in ordinary lathes.

We are aware we are not the first to combine mechanism for turning irregular forms in which a screw-shaft and reciprocating carriage or cutter are distinguishing features; but

Having thus described our invention, we claim as new and desire to secure by Letters Patent—

A cam or eccentric sliding on the grooved shaft H, lathe-carriage F provided with the arms J J, the screw-shaft G, the cutter-slide L, spring R, friction-roller N, and circular cutter M, all constructed and arranged and operating as specified.

HENRY R. HILL.
NELSON W. TWISS.

Witnesses:
 JULIUS TWISS,
 J. W. POND.